United States Patent [19]

Heasley

[11] 4,073,568
[45] Feb. 14, 1978

[54] RETROREFLECTOR UNITS WITH THREE MUTUALLY PERPENDICULAR SURFACES DEFINING A TRIHEDRAL ANGLE OF A RECTANGULAR PARALLELEPIPED

[75] Inventor: James H. Heasley, Shaker Heights, Ohio

[73] Assignee: Ferro Corporation, Cleveland, Ohio

[21] Appl. No.: 635,634

[22] Filed: Nov. 26, 1975

[51] Int. Cl.$^2$ ............................................. G02B 5/124
[52] U.S. Cl. ........................................ 350/103; 350/102
[58] Field of Search ................. 350/103, 112, 97, 102; 350/106, 107, 112; 404/14, 11–12, 20; 240/7.1, 7.1 R

[56] References Cited

U.S. PATENT DOCUMENTS

| | | | |
|---|---|---|---|
| 3,332,327 | 7/1967 | Heenan | 350/103 |
| 3,684,348 | 8/1972 | Rowland | 350/103 |
| 3,758,191 | 9/1973 | Hedgewick | 350/103 |

OTHER PUBLICATIONS

Specification of Stimsonsite Product #88, Elastic Stop Nut Co. Eley, N.J., Nov. 11, 1964.

*Primary Examiner*—John K. Corbin
*Assistant Examiner*—B. W. de los Reyes
*Attorney, Agent, or Firm*—Milton L. Simmons; Wesley B. Taylor

[57] ABSTRACT

A retroreflector of improved efficiency is disclosed comprising, in one form, a light-transmitting sheet adapted in use to be disposed in an angled position such that a normal to the sheet is at an angle of about 5° to about 85° from an incident beam of light. The sheet has front and back opposed, substantially parallel faces. The front face is substantially smooth and defines a light-refracting surface. The back face has a plurality of light-reflecting units. Each unit comprises three mutually perpendicular surfaces defining a trihedral angle of a rectangular parallelepiped and positioned with respect to the front face that the body diagonal of the rectangular parallelepiped is within an angle of 15° of incident light refracted by the front face.

19 Claims, 8 Drawing Figures

RETROREFLECTOR UNITS WITH THREE MUTUALLY PERPENDICULAR SURFACES DEFINING A TRIHEDRAL ANGLE OF A RECTANGULAR PARALLELEPIPED

BACKGROUND OF THE INVENTION

This invention relates to a retroreflector which may be used wherever light reflection is desired. A leading application of the retroreflector is as a retroreflective element of a roadmarker to provide directional guidance, and therefore it is described with respect to this use.

Roadmarkers are mounted on the surface of a roadway, such as along its center line or shoulders, to delineate paths or lanes for traffic, or at intersections to define stopping lines or cross-lanes for traffic, both vehicular and pedestrian. Markers of this type are mounted in spaced apart relation and serve to guide traffic in following or traversing a roadway, or in following a curve or grade in the roadway. Particularly to assist a driver of a vehicle at night, these markers have light reflectors which catch and return incident beams of light from vehicle headlights back toward the source of the light. Since automobiles of recent vintage have quite powerful headlights, the use of roadmarkers has become more widespread. Roadmarkers contribute to traffic safety such as when roads are wet from rain. Under certain conditions, such as fog, roadmarkers can be the only means of orienting a driver to a changing direction of a road.

Many forms of light reflectors have been suggested. They usually suffer from one or more limitations, such as reflecting too small a proportion of incident light while an approaching vehicle is still at an appreciable distance. As a result, reflecting markers are often noticed too late by a driver to be of substantial help.

Further, in order to avoid making a roadmarker an obstruction on the road, the marker preferably is designed to protrude only a slight amount from the road. This requirement augments problems of light reflection. Plain ceramic or plastic markers have been used, but they tend only to scatter the light. Light scattering is self-defeating in that it is accompanied by loss of intensity of the reflected light which materially reduces the effectiveness of the marker.

An effective reflecting system is a well known triple mirror reflex reflecting principle, such as is disclosed in U.S. Pat. No. 1,671,086 to Stimson, and which is referred to in the art as a cube-corner structure. While a cube-corner structure provides satisfactory performance as to light striking perpendicularly against an array or strip of cube-corners, that is, generally parallel to the axes of the cube-corners, this performance falls off fairly rapidly as incident light enters at angles away from the normal to the surface of the cube-corner array.

SUMMARY OF THE INVENTION

The principal object of the present invention is to provide a retroreflector of relatively simple design which provides efficient retroreflectivity and represents an improvement over the known cube-corner structure in that better retroreflectivity is obtained for incident light impinging on the retroreflector at wider angles of incidence. In the present retroreflector, the entering beams of incidental light can be reflected sequentially from three mutually perpendicular surfaces which are so arranged that little or no light is lost.

In one form, the retroreflector comprises a light-transmitting sheet adapted in use to be disposed in an angled position such that a normal to the sheet, that is, an imaginary line perpendicular to the sheet, is at an angle of about 5° to about 85° from an incident beam of light. The sheet has front and back, opposed, substantially parallel faces. The front face is substantially smooth and defines a light-refracting surface, while the back face has a plurality of light-reflecting units. The light-reflecting units comprise three mutually perpendicular surfaces defining a trihedral angle of a rectangular parallelepiped and are positioned with respect to the front face that the body diagonal of rectangular parallelepiped is preferably substantially parallel to and at least within an angle of about 15° to incident light refracted by the front face.

The exposed areas of at least some of the light-reflecting units are preferably coated with metal to aid in their reflecting function. The sheet preferably is fabricated from a light-transmitting organic polymeric resinous material. Desirably, the light-reflecting units include rows of such units which extend transversely across the back face of the sheet and are formed over an appreciable area of that face. Preferably, the rows are contiguous to each other without spacing therebetween. Similarly, it is preferred that the light-reflecting units of each row adjoin one another without spacing or gaps therebetween.

DESCRIPTION OF THE PREFERRED EMBODIMENTS

Figure 1:
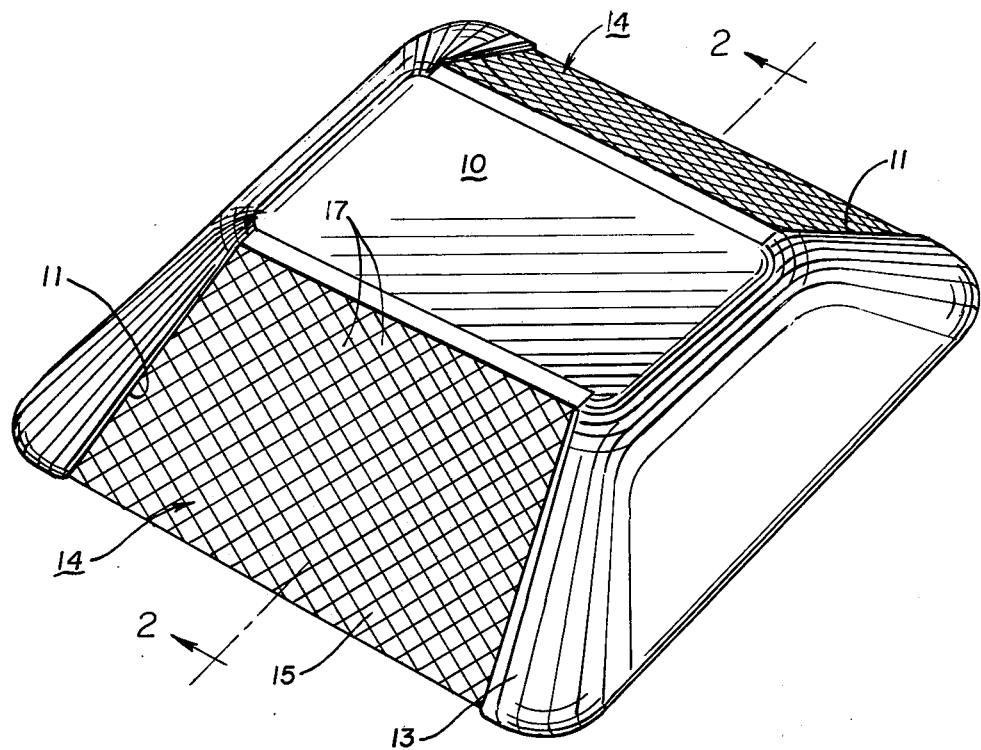
FIG. 1 is a perspective view of a roadmarker containing in sheet form a retroreflective element of the present invention.

Referring to the drawing and initially to the embodiment of FIGS. 1 through 5, a roadmarker comprises a generally truncated pyramidal body 10 having cutaway portions 11 at two opposite sides to form a slope 12 (FIG. 2) and adjoining sidewalls 13 at each opposite side in which retroreflective elements 14 of the present invention are seated. The body 10 and retroreflective element 14 may be fabricated from any suitable material, such as a ceramic or synthetic resinous plastic material, although the retroreflective element must be sufficiently clear to transmit light. Body 10 may be suitably molded from any known ceramic, glazed and pigmented if desired to impart color, or from any other durable, weather-resistant material. The retroreflective element 14 may also be fabricated from any durable, light-transmitting, weather-resistant material, such as glass, but preferably is made from synthetic resins such as polycarbonates and especially from the acrylates like polymethacrylate and polymethylemethacrylate resins. Retroreflective element 14 may be tinted, if desired, to reflect red, yellow or other light, especially if used in a roadmarker.

Referring more particularly to the retroreflective element of FIGS. 1 through 5, this component is in the form of a sheet having front and back, opposed, substantially parallel faces indicated at 15 and 16, respectively. Front face 15 is substantially smooth and defines a light-refracting surface. Back face 16 has a plurality of light-reflecting units generally represented at 17 which preferably are formed directly into the back face by a suitable mold, forming dies, or the like from an original plane face indicated by the broken, imaginary line 18 in FIG. 3, such that preferably the outer corners of the units 17 are coplanar with line 18 as illustrated. Here and elsewhere in the drawing, it will be appreciated that the light-reflecting units are shown greatly oversize to facilitate their illustration and description.

Figure 2:
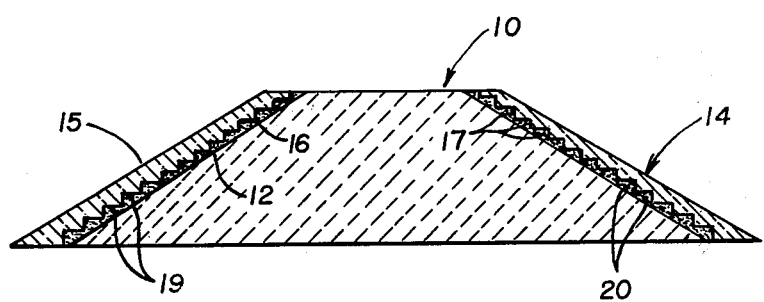
FIG. 2 is a cross-section of FIG. 1 on the line 2—2.

To aid in their reflecting function, light-reflecting units 17 may be coated with metal or metalized in a manner known in the art to form a metallic layer 19 (FIG. 2). Aluminum is the preferred metal for this purpose. An adhesive 20 fills the volume between slope 12 of the roadmarker and light-reflecting units 17 to secure the retroreflective element 14 in place in cut-away portions 11. A wide variety of adhesives may be used for this purpose such as natural adhesives like glue, bitumen, etc., or resinous adhesives like epoxy, polyester or polyurethane resins. Indeed, the same adhesives can be used to secure roadmarker 10 to a surface of a road, although catalyzed thermosetting adhesives are preferred for this purpose.

Figure 3:
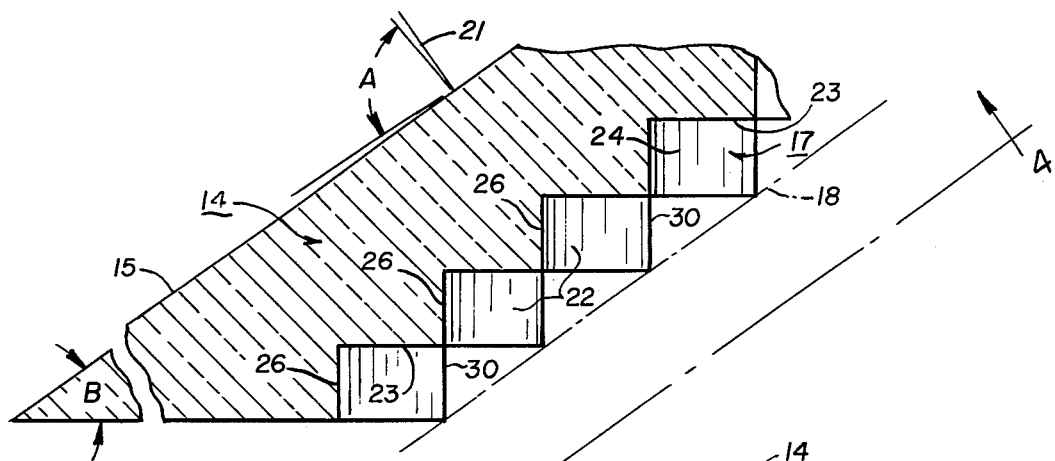
FIG. 3 is a greatly enlarged, fragmentary view of the retroreflective sheet of FIG. 2 and illustrates light-reflecting units in stepped rows or tiers.
Figure 4:
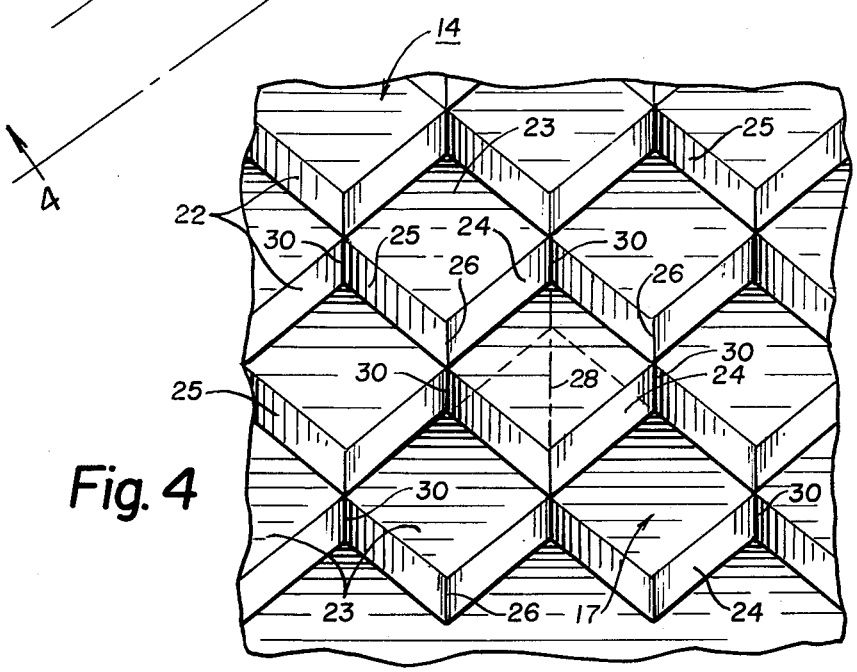
FIG. 4 is a view of FIG. 3 on the plane of the line 4—4.
Figure 5:
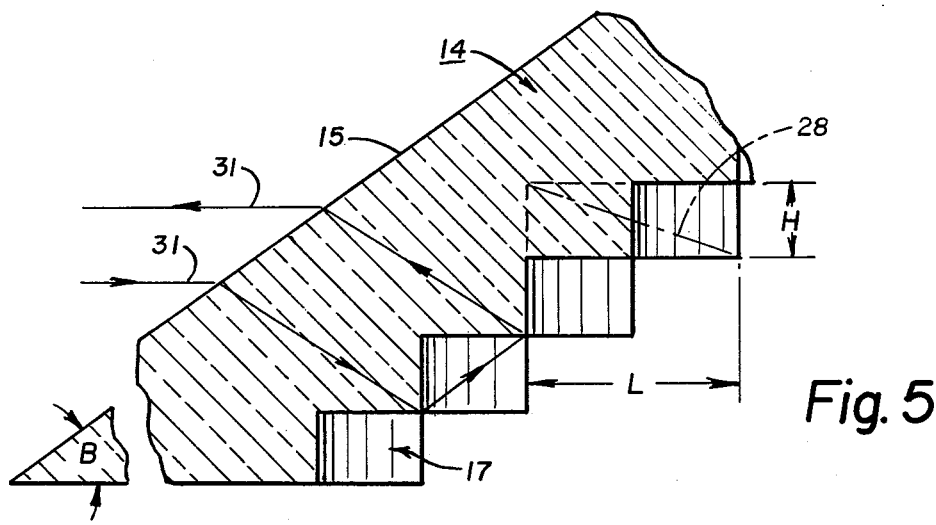
FIG. 5 is a view similar to FIG. 3 and shows the retroreflective route a beam of light may take with that embodiment.

Considering now in greater detail the retroreflective element itself, it will be apparent that the element can be used alone in sheet form as illustrated by FIGS. 3, 4 and 5, or as part of any support, such as a roadmarker, sign, or the like, from which retroreflection of light is desired. In order to provide the improved retroreflection of the present invention, the retroreflective sheet must be angled with respect to approaching incident pencils or beams of light. The light itself may be traveling in any direction and in any plane. To relate the relative position of the retroreflective sheet 14 to approaching light which is generally considered to travel in straight lines, the retroreflective sheet of the present invention should be disposed in an angled position such that a normal, that is a line perpendicular to the sheet, is at an angle of about 5° to about 85°, and preferably from about 30° to about 85°, from an incident beam of light. Accordingly, if line 21 in FIG. 3 represents a normal to the front face 15 of the retroreflective sheet, the sheet is in position to receive and retroreflect light approaching the sheet within the angle A which represents an angle of about 5° to about 85° from line 21.

In practice, the retroreflector is usually positioned to receive and retroreflect light traveling generally in a horizontal plane, such as in a road sign or a roadmarker. While the above described angulation is important and paramount in all forms of the present invention, as a further indication of the angulation involved and when the retroreflector is used to intercept horizontally traveling light, the angle B sheet 14 makes with the horizontal may be within the range of about 5° to about 60°.

When the retroreflector is part of a roadmarker, the angle B sheet 14 makes with the horizontal may be within the range of about 15° to about 45°, since a roadmarker is normally lower in elevation with respect to the approaching light. However, these angulations are secondary to the angulation described in the proceeding paragraph which controls in all cases.

The back face 16 of retroreflective sheet 14 comprises light-reflecting units generally represented at 17 in the embodiment of FIG. 3 which, in order to achieve the improved efficiency of retroreflection afforded by the present invention, cover an appreciable area of the back face and preferably are coextensive with that face. The resulting array of light-reflecting units provides a more even distribution of light reflection with little or no blind spots. The array of all the light-reflecting units forms a multifaceted reflecting surface which totally retroreflects light in a particular direction.

In a preferred form, the array of light-reflecting units are stacked to form a series of steps of rows 22 of units which extend transversely across back face 16. As shown in FIG. 3, when the retroreflective sheet is in use and angled as previously described, rows 22 are laterally spaced from one another due to their generally vertical disposition. It is, therefore, not merely a matter of stacking rows 22 atop one another; rather, they must be laterally offset with respect to each other as shown. While size is not critical, light-reflecting units 17 have been shown oversized in the drawing for purposes of illustration. In one embodiment, each row was about 1/16 inch in height and the rows were spaced laterally (or horizontally as viewed in FIG. 3) about 1/16 inch.

Figure 6:
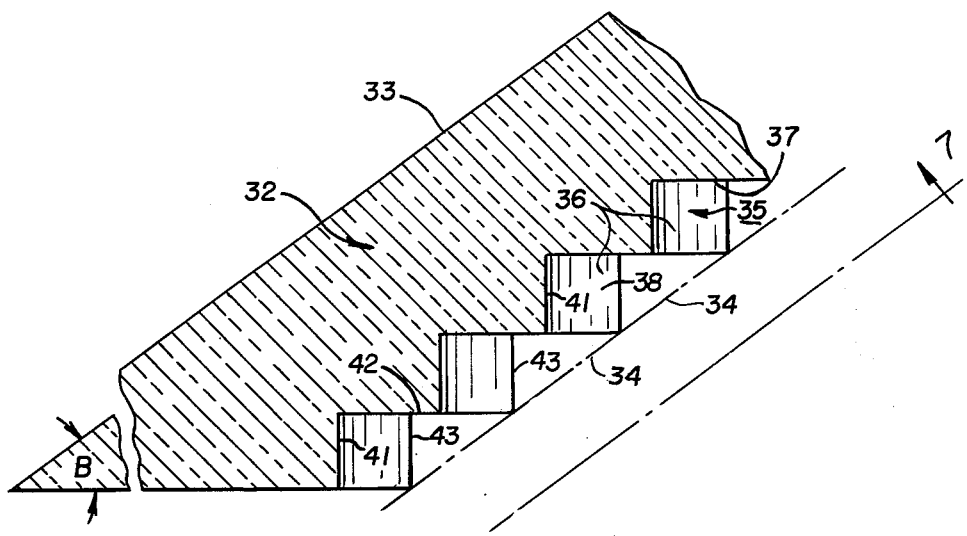
FIG. 6 is a greatly enlarged, fragmentary view, similar to FIG. 3, of a modified form of the present retroreflector.
Figure 7:
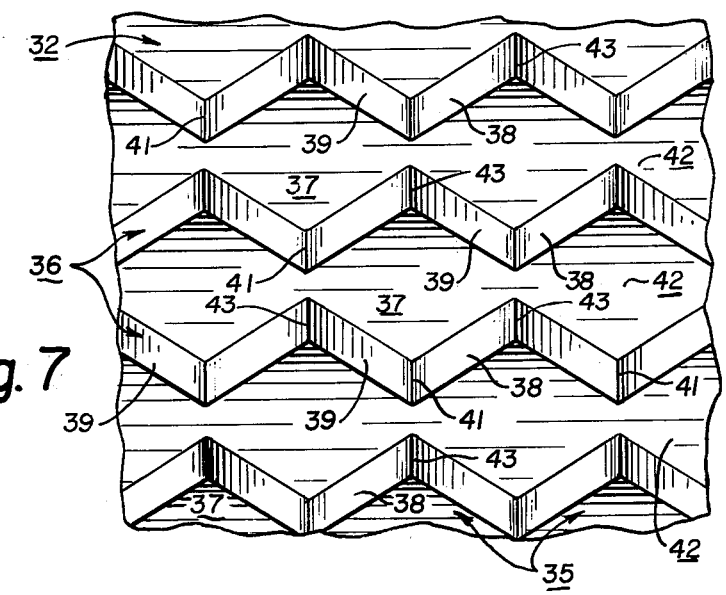
FIG. 7 is a view of FIG. 6 on the plane of line 7—7.
Figure 8:
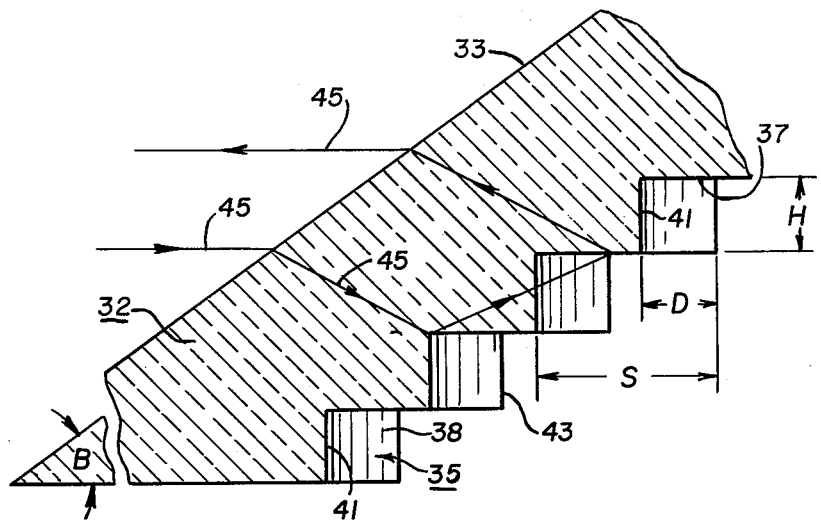
FIG. 8 is a view similar to FIG. 6 and shows the retroreflective route a beam of light may take with that embodiment.

The embodiment of FIGS. 3, 4 and 5 illustrates the preferred form of light-reflecting units, while the embodiment of FIGS. 6, 7 and 8 represents a modified form. The light-reflecting units of both embodiments may generally be considered to comprise units of three mutually perpendicular surfaces defining a trihedral angle of a rectangular parallelepiped, just as though a corner of a rectangular parallelepiped was pressed against the back face of the retroflective sheet while it was deformable in order to form the unit. In the preferred practice, such a corner penetrates into the sheet until the remote edges of the two vertically disposed sides of the rectangular parallelepiped reach the back face of the sheet.

If a polyhedron is a solid bounded by planes, and a prism is a polyhedron of which two faces are congruent polygons in parallel planes, and the other faces are parallelograms having two of their sides in the two parallel planes, a parallelepiped may be broadly defined as a prism whose bases are parallelograms. A right parallelepiped, then, is a parallelepiped with edges perpendicular to the bases. As used here and in the claims, the term "rectangular parallelepiped" means a right parallelepiped whose bases are rectangles.

Of the three surfaces of the light-reflecting units of all illustrated embodiments, one surface is horizontally disposed when the retroreflector is in the angled position of about 5° to about 85° from an incident beam of light, and the other two of the surfaces are vertically disposed and intersect each other in a direction toward the front face of the retroreflector to form an intersection line. As used here and in the claims, the term "horizontally disposed" is taken to mean generally horizontal, that is, more horizontal than vertical, and not an exact, true horizontal direction. Similarly, as used here and in the claims, the term "vertically disposed" is taken to mean generally vertical, that is, more vertical than horizontal and not an exact, true vertical direction.

For example, in the embodiment of FIGS. 3, 4 and 5, at least some of the light-reflecting units 17 comprise three mutually perpendicular surfaces defining a trihedral angle of a rectangular parallelepiped as described. One surface 23 is horizontally disposed when retroreflective sheet 14 is in the described, operational, angled position, and two surfaces 24 and 25 are vertically disposed and intersect each other in a direction toward front face 15 to form an intersection line 26. A light-reflecting unit 17 is so positioned with respect to front face 15 that a body diagonal of a rectangular parallelepiped, as illustrated in phantom at 28 in FIGS. 28 in FIGS. 4 and 5, is preferably substantially parallel to and at least within an angle of about 15° of incident light refracted by face 15. The body diagonal is a straight line drawn from the trihedral angle formed by surfaces 23, 24 and 25 to the opposite trihedral angle of the rectangular parallelepiped.

While the light-reflecting units of any embodiment may be spaced from one another along a given row and rows may likewise be spaced from one another, it is preferred that the light-reflecting units adjoin one another in a row without spacing therebetween and that consecutive rows be contiguous to each other without spacing therebetween to avoid possible blind spots in the retroreflection Where the units within a row have no spacing therebetween, the vertically disposed surfaces, such as surfaces 24 and 25 of the embodiment of FIGS. 3, 4 and 5, intersect vertically disposed surfaces of adjoining light-reflecting units 17 in a direction away from front face 15 to form a second intersection line 30. This line is not only substantially parallel to the first mentioned intersection line 26 but, in the embodiment of FIGS. 3, 4 and 5, is substantially aligned with an intersection line 26 of an adjacent higher row 22.

FIG. 5 illustrates the retroreflective route of an isolated beam of light represented at 31 for the embodiment of FIG. 3. The beam is first refracted by front face 15 and directed toward light-reflecting units 17. Upon striking any one of the three contiguous faces 23, 24 or 25 (shown as first striking a horizontally disposed surface 23 in FIG. 5), beam 31 is reflected in turn by the three faces and returned substantially parallel to its incident direction. In a special case, if sheet 14 is adapted to receive horizontally directed light and makes an angle B with the horizon, surface 23 is a square, surfaces 24 and 25 are identical rectangles, each row 22 has a vertical height H in inches (FIG. 5), the overall horizontal length of two reflecting units of two adjacent rows is L in inches, and sheet 14 has an index of refraction of light $n$, in the ideal situation these values have substantially the relation:

$$\cos B = n \cos\left\{\tan^{-1}\left[\frac{3H/L}{1-2\frac{H^2}{L^2}}\right]\right\}$$

When these values are exactly met, the path of beam 31 of light in FIG. 5 within the retroreflective sheet 14 is exactly parallel to the body diagonal 28 of the rectangular parallelepiped. However, it will be apparent that deviations from one or more of these values may be taken without losing the advantages of the present invention.

FIGS. 6, 7 and 8 illustrate a modified form of the invention. This form differs from that of FIGS. 3, 4 and 5 principally in that the rows of light-reflecting units are spaced farther apart in a horizontal direction as viewed in FIG. 6, so that a land or continuous plane is formed between adjacent rows which extends transversely across the back of the retroreflective sheet.

More particularly, the retroreflecting sheet 32 of FIG. 6 is positioned in use, like the embodiment of FIGS. 3, 4 and 5, at an angle of about 5° to about 85° and preferably from about 30° to about 85° from an incident beam of light. Sheet 32 has front and back, opposed, substantially parallel faces shown at 33 and 34, respectively, back 34 being formed along the plane of the line bearing this reference number. Front face 33 is substantially smooth and defines a light-refracting surface, while back face 34 has a plurality of light-reflecting units formed into that face and generally represented at 35. Rows 36 of units 35 are formed into the back face and extend transversely across the back of sheet 32. At least some of the reflecting units comprise three mutually perpendicular surfaces defining a trihedral angle of a rectangular parallelepiped as previously described. One surface 37 is horizontally disposed when sheet 32 is in the angled position, and the other two surfaces 38 and 39 are vertically disposed and intersect each other in a direction toward front face 33 to form an intersection line 41. In this case, however, the horizontally disposed surfaces 37 of each unit are continuous with respect to each other in a given row (FIG. 7), so that a land or continuous plane indicated at 42 is formed.

The vertically disposed surfaces 38 and 39 of at least some of the light-reflecting units 35 can be spaced apart or preferably intersect vertically disposed surfaces of adjoining light-reflecting units 35 in a direction away from front face 32 to form a second intersection line 43 that is substantially parallel to the first mentioned intersection line 41. As shown especially in FIG. 6, the second intersection line 43 of one row 36 is spaced laterally of the first mentioned intersection line 41 of an adjacent row.

FIG. 8 illustrates the retroreflective route of an isolated beam of light represented at 45 for the embodiment of FIGS. 6 and 7. The beam is first refracted by front face 33 and directed toward light-reflecting units 35. Upon striking any one of the three contiguous, mutually perpendicular surfaces 37, 38 or 39 (shown as first striking a horizontally disposed surface 37), beam 45 is reflected in turn by the three surfaces and returned substantially parallel to its incident direction. In a special case, if the retroreflective sheet 32 forms an angle B with the horizontal, each row 36 has a vertical height H in inches (FIG. 8), the horizontal length of each reflecting unit is D in inches, and the overall horizontal length of two reflecting units of two adjacent rows 36 is S in inches, in the ideal situation these values have substantially the relation:

$$\tan B = \frac{H}{S - D}$$

When these values are exactly met, the retroreflective path of the beam of light 45 is exactly parallel to the incident beam of light 45, if the retroreflective sheet 32 is disposed so as to receive the incident beam of light within angle A as described for FIG. 3. However, it will be appreciated that deviations from one or more of these values may be taken without losing advantages of the present invention.

Neither light-reflective units 17 nor 35 have reentrance surfaces and therefore are easily molded. A projection of the array of units 17 or 35, that is, of just the units alone, forms a like array of hexagons filling the projection plane. Accordingly, tools for forming molds to shape the reflecting surfaces can be made from pins of hexagonal cross-section having three mutually perpendicular planar faces machined on the end of each pin. At least in the embodiment of FIG. 3, these planar faces are mutually perpendicular to a body diagonal 28 of a rectangular parallelepiped which is parallel to the lateral edges of such pins under the ideal situation where diagonal 28 is exactly parallel to the refracted incident light.

It will be apparent that light-reflecting units 17 and 35 can, if desired, be metallized to aid in their reflecting function as described in connection with FIG. 2. In FIGS. 3 through 8, this metallization has not been shown to facilitate illustration of the structure of the light-reflecting units.

Although the foregoing describes several embodiments of the present invention, it is understood that the invention may be practiced in still other forms within the scope of the following claims.

I claim:

1. A retroreflector comprising a light-transmitting sheet adapted in use to be disposed in an angled position such that a normal to the sheet is at an angle of about 5° to about 85° from an incident beam of light, said sheet having front and back, opposed, substantially parallel faces, the front face being substantially smooth and defining a light-refracting surface, the back face having a plurality of light-reflecting units, at least some reflecting units comprising three mutually perpendicular surfaces defining a trihedral angle of a rectangular parallelepiped and positioned with respect to said front face that the body diagonal of the rectangular parallelepiped is within an angle of about 15° to incident light refracted by said front face, at least two of said three mutually perpendicular surfaces being rectangular and said two surfaces being vertically disposed.

2. The retroreflector of claim 1 in which the exposed areas of at least some of said reflecting units are coated with metal to aid in their reflecting function.

3. The retroreflector of claim 1 in which said sheet comprises a light-transmitting organic polymeric resinous material.

4. The retroreflector of claim 1 in which said sheet is adapted in use to be disposed in an angled position such that a normal to the sheet is at an angle of about 30° to about 85° from an incident beam of light.

5. A retroreflector body containing as a retroreflective element the retroreflector of claim 1.

6. The retroreflector of claim 1 in which said plurality of light-reflecting units includes rows of said units extending transversely across said back face and formed over an appreciable area of said face.

7. The retroreflector of claim 6 in which said rows are contiguous to each other without spacing therebetween.

8. The retroreflector of claim 6 in which said light-reflecting units of each row adjoin one another without spacing therebetween.

9. The retroreflector of claim 6 in which said angled position said sheet makes an angle B with the horizontal, said rows have a vertical height of H in inches, the horizontal length of each of reflecting unit is D in inches, the overall horizontal length of two reflecting units of two adjacent rows is S in inches, and said values have substantially the relation:

$$\tan B = \frac{H}{S - D}$$

10. The retroreflector of claim 1 in which one of said three mutually perpendicular surfaces of said at least some reflecting units is horizontally disposed when the retroreflector is in said angled position, and the other two of said surfaces are vertically disposed and intersecting each other in a direction toward said front face of the retroreflector to form an intersection line, said vertically disposed surfaces of at least some of said light-reflecting units intersect vertically disposed surfaces of adjoining light-reflecting units in a direction away from said front face to form a second intersection line that is substantially parallel to the first mentioned intersection line.

11. The retroreflector of claim 10 in which said second intersection line of one row is spaced laterally of the first mentioned intersection line of an adjacent higher row.

12. The retroreflector of claim 10 in which said second intersection line of one row is substantially aligned with the first mentioned intersection line of an adjacent higher row.

13. A retroreflector comprising a light-transmitting sheet adapted in use to be disposed in an angled position such that a normal to the sheet is at an angle of about 30° to about 85° from an incident beam of light, said sheet having front and back opposed, substantially parallel faces, the front face being substantially smooth and defining a light-refracting surface, the back face having a plurality of light-reflecting units formed into that face, the outer corners of said units being substantially coplanar with said back face, at least some reflecting units comprising three mutually perpendicular surfaces defining adjacent sides of a rectangular parallelepiped, one of said surfaces of each unit being horizontally disposed when the retroreflector is in said angled position, and the other two of said surfaces being rectangular and vertically disposed, at least some of said units being positioned with respect to said front face that a body diagonal of a rectangular parallelepiped serves as the optical axis of that unit and is substantially parallel to incident light refracted by said front face.

14. The retroreflector of claim 13 in which the exposed areas of at least some of said reflecting units are coated with metal to aid in their reflecting function.

15. The retroreflector of claim 13 in which said sheet comprises a light-transmitting organic polymeric resinous material.

16. The retroreflector of claim 13 in which said plurality of light-reflecting units including rows of said units extending transversely across said back face and formed over an appreciable area of said face.

17. The retroreflector of claim 16 in which said rows are contiguous to each other without spacing therebetween.

18. The retroreflector of claim 16 in which the light-reflecting units of each row adjoin one another without spacing therebetween.

19. The retroreflector of claim 13 in which said angled position the retroreflector is adapted to receive horizontally directed light, said horizontally disposed surface of a light-reflecting unit is a square and the other two surfaces are identical rectangles, said sheet makes an angle B with the horizontal, said units including rows of units extending transversely across said back face, each row having a length L in inches, said sheet has an index of refraction of n, and said values have substantially the relation:

$$\cos B = n \cos \left\{ \tan^{-1} \left[ \frac{3^H/L}{1 - 2\frac{H^2}{L^2}} \right] \right\}$$

* * * * *